(12) United States Patent
Johnson

(10) Patent No.: US 6,690,568 B2
(45) Date of Patent: Feb. 10, 2004

(54) FLUID DIELECTRIC VARIABLE CAPACITOR

(75) Inventor: Wayne L. Johnson, Phoenix, AZ (US)

(73) Assignee: Tokyo Electron Limited, Tokyo (JP)

( * ) Notice: Subject to any disclaimer, the term of this patent is extended or adjusted under 35 U.S.C. 154(b) by 17 days.

(21) Appl. No.: 10/323,917

(22) Filed: Dec. 20, 2002

(65) Prior Publication Data

US 2003/0090853 A1 May 15, 2003

Related U.S. Application Data

(63) Continuation of application No. PCT/US01/18702, filed on Jun. 11, 2001.
(60) Provisional application No. 60/212,738, filed on Jun. 20, 2000.

(51) Int. Cl.$^7$ ................................................ H01G 7/00
(52) U.S. Cl. .................... 361/277; 361/278; 361/279; 361/272; 361/298.1; 361/280
(58) Field of Search ................ 361/277, 278, 361/279, 287, 295, 296, 297, 272, 280, 298.1, 293

(56) References Cited

U.S. PATENT DOCUMENTS

| | | | |
|---|---|---|---|
| 3,949,280 A | | 4/1976 | Odagiri et al. |
| 3,996,503 A | | 12/1976 | Ichikawa |
| 4,953,057 A | * | 8/1990 | Davidian |
| 5,162,972 A | * | 11/1992 | Gripshover et al. |
| 5,175,472 A | | 12/1992 | Johnson, Jr. et al. |
| 5,414,589 A | | 5/1995 | Amano et al. |
| 5,537,109 A | | 7/1996 | Dowd |
| 5,557,495 A | | 9/1996 | Belcher et al. |
| 5,867,360 A | | 2/1999 | Kishishita et al. |
| 6,530,217 B1 | * | 3/2003 | Yokota et al. |

FOREIGN PATENT DOCUMENTS

| | | | |
|---|---|---|---|
| EP | 0 175 903 | | 4/1986 |
| EP | 0 693 759 | | 1/1996 |
| JP | 2002208538 | * | 7/2002 |

OTHER PUBLICATIONS

"Stepping Motor," McGraw–Hill Encyclopedia of Science & Technology, 7$^{th}$ Ed., vol. 17, pp. 417–420.

* cited by examiner

Primary Examiner—Anthony Dinkins
Assistant Examiner—Nguyen T. Ha
(74) Attorney, Agent, or Firm—Pillsbury Winthrop LLP

(57) ABSTRACT

This invention relates to an apparatus and method of using a high frequency, high power, fluid dielectric variable capacitor for an impedance matching network. The apparatus includes of a bow-tie rotary vane, a set of two fixed vanes, and a set of rotating vanes adapted to rotate interdigitally between the fixed vanes. A dielectric fluid is circulated between the fixed vanes and the rotating vanes for cooling the device. This arrangement facilitates production of a device having a higher capacitance and a smaller size, thus making it suitable for use in a matching network.

11 Claims, 4 Drawing Sheets

FLUID DIELECTRIC VARIABLE CAPACITOR

This is a continuation of International Application No. PCT/US01/18702 which was filed on Jun. 11, 2001, and also claims benefit of U.S. Application No. 60/212,738, filed Jun. 20, 2000, the contents of both of which are incorporated herein in their entirety.

BACKGROUND OF THE INVENTION

The present invention generally relates to the field of variable capacitors. More particularly, the present invention relates to a novel liquid filled variable capacitor that operates at high frequency and high RF power.

Variable capacitors are used in a variety of different capacities and come in a number of different forms. An area of particular importance, in terms of the utility of variable capacitors, is the field of semiconductor RF fabrication apparatus in which an RF field is provided to establish a plasma with which various fabrication processes can be carried out. In such apparatus, RF power is supplied from a source to an electrode that is in communication with a plasma region within a chamber. Variable capacitors are used in RF power match networks to match the impedance of the electrode and the plasma, constituting an electrical load, to the impedance of a source which delivers RF power to the plasma. The purpose of a match network is to increase the energy transfer efficiency between the load and the source. If the impedance match is sufficiently accurate, a measurement of the capacitor value could provide an accurate measure for the RF load. There are several different plasma procedures to be considered in the general application of wafer processing: plasma etching, plasma deposition, plasma photo-resist stripping, ion sources implantation, plasma chamber cleaning, etc. The plasma for each of these procedures will have a different RF load associated with it.

The current trend in the plasma equipment industry is toward higher frequencies and higher RF powers to sustain the plasma. Many common RF designs use standard RF components that force the match network to be placed at large distances away from the electrode. At higher frequencies, however, these larger distances lead to power losses along the non-matched portion of the transmission line between the match network and the electrodes. The use of smaller RF components can shorten this distance, thereby reducing the power loss.

One of the RF components used in the match network is an RF power capacitor. The most commonly used RF power capacitors are vacuum variable capacitors, which have one set of movable concentric tubes forming a first plate and one set of fixed concentric tubes forming a second plate. The movable tubes are connected to a bellows. The movement of the bellows brings the movable concentric tubes in and out interdigitally between the fixed concentric tubes.

The capacitance of a capacitor is generally determined by its ability to store energy based upon the amount of charge accumulated on overlapped surfaces. Thus, the larger the capacitor, the greater the amount of stored charge, generally. This can be more easily seen from the equation:

$$Q = C*V \quad (1)$$

Where Q is the total charge stored in the capacitor, C is the capacitance and V is the voltage between the opposite plates. Thus, the capacitance C of the device is determined largely by the geometry of the opposing plates. For a parallel plate capacitor, the capacitance is given by the equation:

$$C = k*\epsilon_o*A/d \quad (2)$$

Where k is the relative dielectric constant of the medium, $\epsilon_o = 8.854e^{-12}$ Farads/Meter is the permittivity of free space, A is the surface area of the overlapped portions of the plates, and d is the distance between the plates. The capacitance of the vacuum variable capacitor can be calculated using equation (2), where A is the combination of all opposing surface areas between the moving and fixed tubes, d is the distance between the moving and fixed tubes. As the amount of overlapped area changes, the capacitance changes.

A significant problem associated with the vacuum variable capacitor, however, is its relatively large size, which requires that it be placed a large distance from the matching network. As stated above, large distances between the capacitor electrodes and the matching network lead to power losses. Another problem with the vacuum variable capacitor is its degradation over time, due to the wear and tear of the bellows from repeated flexing. Additionally, the inductance of the vacuum bellows changes with time. Yet another problem with the vacuum variable capacitor is that the inductance of the bellows is in series with the capacitance. This inductance causes the self-resonance point of the capacitor to occur at a lower frequency. Therefore, high frequency operations of this type vacuum variable capacitor are limited. Additionally, vacuum variable capacitors have a very large power loss at high frequencies and large amplitude RF power.

U.S. Pat. No. 5,162,972, issued Nov. 10, 1992, assigned to the United States Navy, entitled "Liquid filled variable capacitor", describes a liquid filled variable capacitor or pulse forming line (PFL). The capacitor provides variable frequency, impedance, and pulse length without changing the capacitor or PFL (pulse forming line) hardware. The capacitor is constructed from two or more conducting surfaces and a dielectric fluid mixture separating the conducting surfaces. A fluid supply system furnishes the dielectric fluid mixture to the conducting surfaces and provides for varying of the dielectric constant of the fluid and thus the capacitor operating characteristics, by varying the mixture composition. The fluid supply system has a mixing tank connected to both a supply of high dielectric constant fluid and a supply of low dielectric constant fluid. The high dielectric constant fluid and low dielectric constant fluid are mixed to obtain a dielectric fluid having the desired dielectric constant. A pump conveys the dielectric fluid between the mixing tank and the conducting surfaces while a heat exchanger controls the temperature of the dielectric fluid.

U.S. Pat. No. 5,867,360, issued on Feb. 2, 1999, assigned to Murata Manufacturing Co., Ltd., Nagaokakyo, Japan and entitled "Variable capacitor" describes a variable capacitor having a stator with a stator electrode and a rotor with a rotor electrode. The rotor and stator are both housed in a recess section of a casing while allowing the recess section to be closed by a cover, enabling the rotor to be brought into stable close contact with the stator.

U.S. Pat. No. 3,996,503, issued on Dec. 7, 1976, assigned to Tokyo Incorporated, Tokyo, Japan and entitled "Variable Capacitor" describes a variable capacitor which includes a plurality of stator plates supported on spaced parallel rods. A plurality of rotor plates supported on a shaft are arranged so that each rotor plate is placed a predetermined distance from the surface of the adjacent stator plate. This is accomplished by spacer members disposed between the adjacent stator plates as well as between the adjacent rotor plates. Each spacer member is made of metal wire, with a circular cross-section, and is shaped in the form of a ring. Use of the metal wire having a predetermined dimension is much more convenient than a tube or sleeve. Consequently fixing the distance between the stator plates and between the rotor plates can be performed with high accuracy.

BRIEF SUMMARY OF THE INVENTION

The present invention provides a capacitor and method for varying the capacitance of the capacitor in order to accurately match load and source impedances. The capacitor comprises a housing and a number of pairs of fixed first vanes positioned within the housing and forming a first plate of the capacitor. The capacitor also includes a number of pairs of second vanes forming a second plate of the capacitor and mounted to rotate interdigitally between the number of pairs of first fixed vanes. Finally, the capacitor includes means for circulating a dielectric fluid between the first and second pairs of vanes. It can also be a gas such as SF6 even though that gas has little heat capacity and must be flowed at high rates. SF6 gas also has a dielectric constant close to 1 so the capacitance per unit area for a fixed separation between capacitor plates, or vanes, is a factor of 3 less than flourinert.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION OF THE INVENTION

Figure 1:
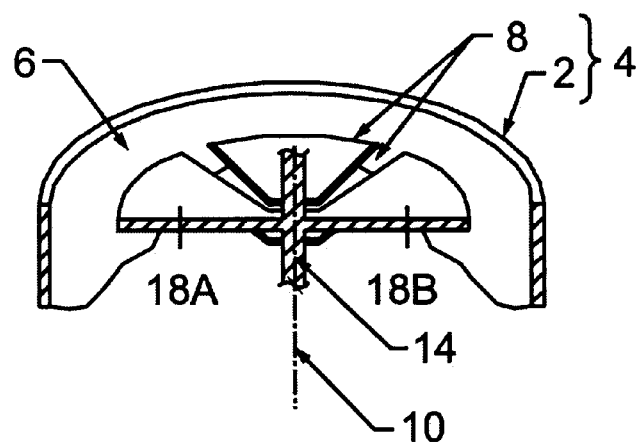
FIG. 1 is a cross-sectional view illustrating basic components of an exemplary liquid filled variable capacitor device according to the present invention.

FIG. 1 illustrates one embodiment of a variable capacitor according to the present invention. The amount of stored energy in a capacitor is dependent on the amount of accumulated charge on overlapped surfaces of the device. The greater the overlapped surface areas, the greater the capacitance. In the device of FIG. 1, a cylindrical housing 2 forms a stator 4 together with a first number of vanes 8 conductively and fixedly attached to an inner surface of housing 2.

Figure 2:
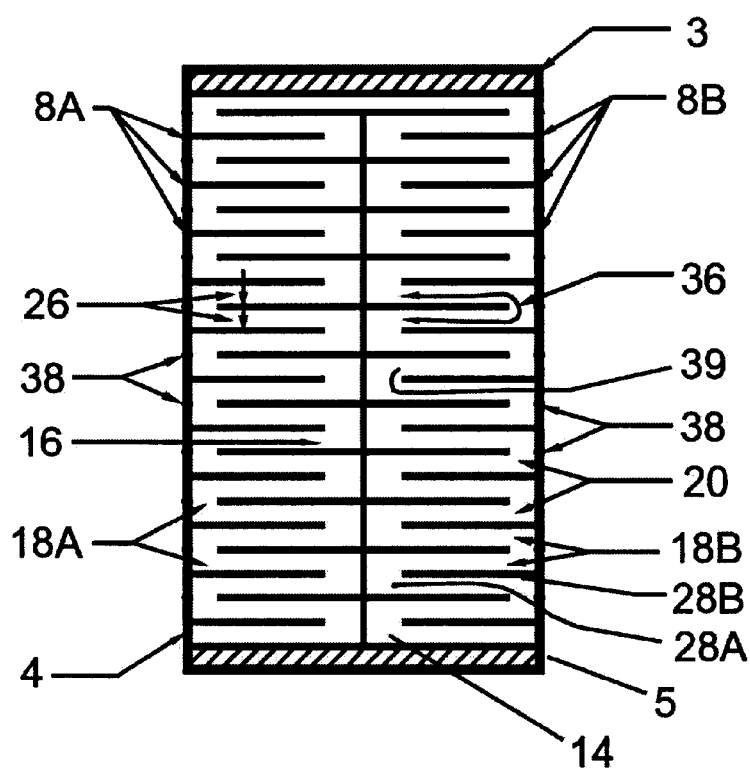
FIG. 2 is a side cross-sectional view of the device of FIG. 1.

The first number of vanes 8 provides a portion of the surfaces that are needed for accumulation of charges and constitute a first plate of the capacitor. The first number of vanes 8 are attached to the inner surface of the housing 2 in a manner which forms a number of different pairs of vanes 8a, 8b positioned inside the housing 2 and spaced apart along a longitudinal axis 10 of housing 2, from the bottom to the top of the housing 2, as shown in FIG. 2. Vanes 8a and 8b of each pair lie in a common plane perpendicular to the longitudinal axis 10. However, the vanes 8a, 8b are at diametrically opposite sides of the inner surface.

Next, a rotor 14 with a second number of vanes 18 attached thereto, is positioned within housing 2. Finally, a top 3 and a bottom 5 are provided, as shown in FIG. 2, to form a seal for housing 2.

Figure 3:
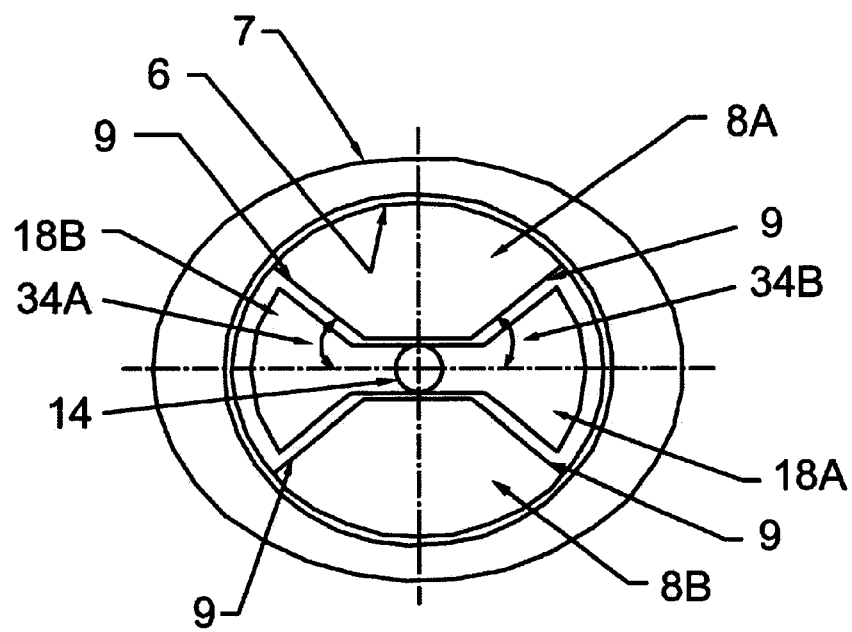
FIG. 3 illustrates a top view of the device of FIG. 1 depicting the fixed vanes and the rotating vanes.

FIG. 2 is a side cross-sectional view of the device taken along a plane I—I of FIG. 3 and with rotor 14 rotated by 90° relative to the position shown in FIGS. 1 and 3. As illustrated in FIG. 2, the rotor 14 includes an elongated shaft 16 having the second number of vanes 18 attached thereto. As shown, the vanes 18 are composed of a second number of vane pairs 18a, 18b, vane 18a of each pair being diametrically opposite vane 18b of the pair. Vanes 18 constitute a second plate of the capacitor.

Figure 4:
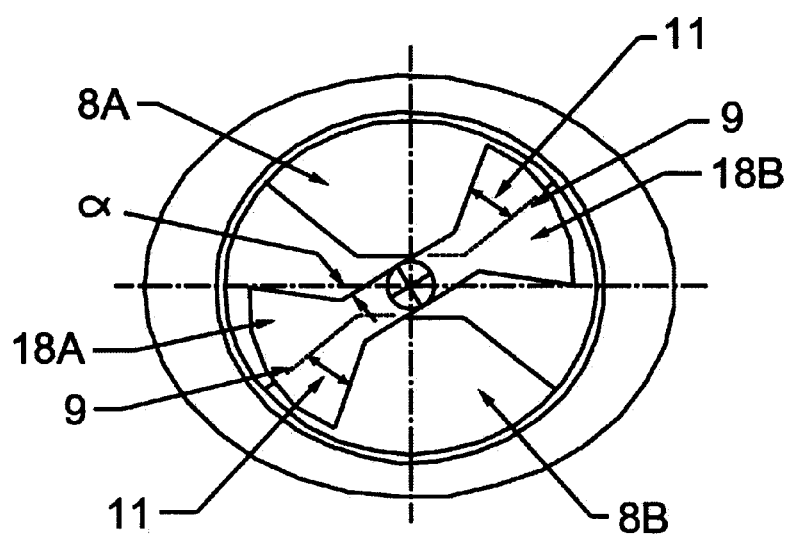
FIG. 4 illustrates a top view of the device of FIG. 1 with overlapping surface areas.

FIG. 3 illustrates a top view of the device of the invention with rotor 14 in a same position as in FIG. 1. As shown here, the rotor 14 is positioned substantially in the center of the stator 4. Each vane 18 extends over about ¼ of a full circle. During the interdigital rotation of the second number of vane pairs 18a, 18b, surfaces thereof come to overlap surfaces of the first number of vane pairs 8a, 8b in regions 11, as seen in FIG. 4, which, in turn, varies the capacitance of the device. The amount of the overlapping surface area of regions 11 is proportional to the capacitance as seen from equation (2). Thus, the device would have a greater capacitance in the position of FIG. 4 than in the positions of FIG. 3, since the amount of overlapping surface areas 11 is larger in the position of FIG. 4.

The stator 4 and the rotor 14 may each have a large number of vanes 8, 18, which can each have a small diameter. The smaller the diameter, the lower the charge spreading inductance of the capacitor. Therefore, the problem associated with having the inductance in the vanes in series with the capacitance, as compared to the vacuum variable capacitor mentioned above, is minimized. Thus, construction of the device in accordance with the present invention shifts the self-resonance point to a higher frequency. The result is that higher operational frequencies and lower power losses may be achieved using a fluid dielectric variable capacitor provided in accordance with the instant invention.

Figure 5:
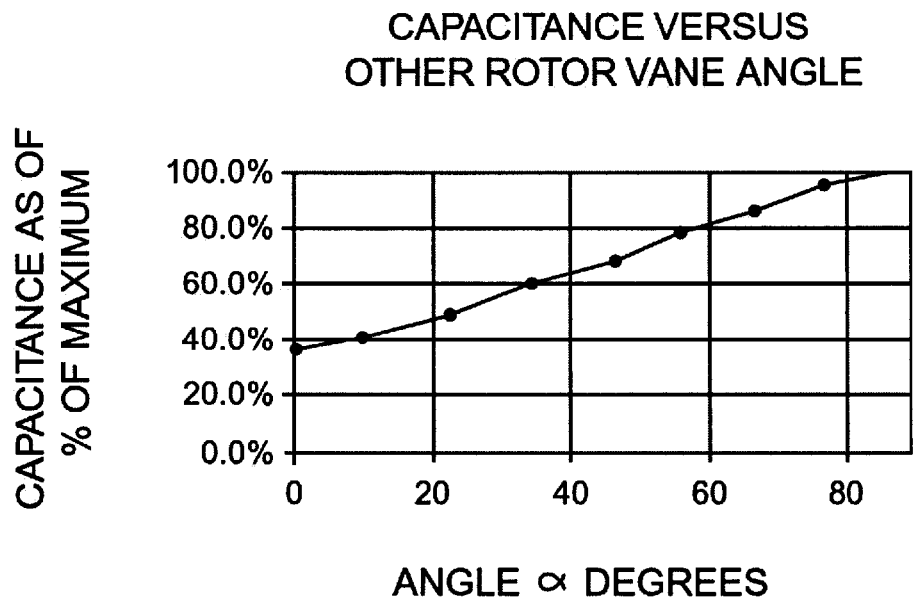
FIG. 5 is a graph illustrating the capacitance of the device of FIG. 1 versus the rotor vane angle.

Also shown in FIG. 3 are angles 34a, 34b formed by side edges 9 of vanes 8a, 8b with respect to the orientation of the vanes 8 within the stator 4 at the minimum capacitance setting. These angles allow for the best ratio of C max to C min Shown also in FIG. 4 is angle α, which reflects the degree of rotation of the rotor 14. As shown in the graph of FIG. 5, the capacitance C is at 100% of its maximum value when the rotation angle α is at 90 degrees. However, when the capacitance C is at 100% of its maximum value, the heat generated in the device is also at its maximum.

Referring again to FIG. 2, vanes 8 are separated from vanes 18 by distances d, which term is defined in connection with equation (2). Thus, in addition to the overlapped surface areas 11, the capacitance C of equation (2) is inversely proportional to the distance d between stator and rotor vane surfaces. Electrodes 28a and 28b are fixed in any suitable manner to respective vanes 8 and 18 to provide electrical connections for the device.

Figure 6A:
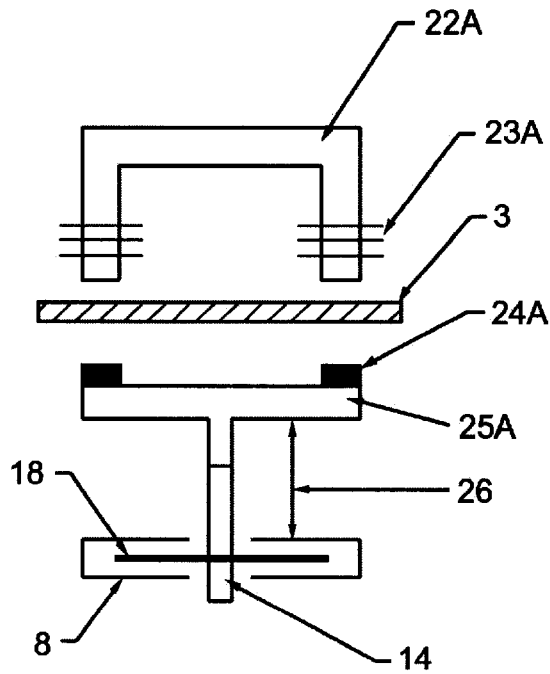
FIGS. 6A and 6B are simplified pictorial views of two forms of construction for a motor which may be included in a capacitor device according to the present invention.
Figure 6B:
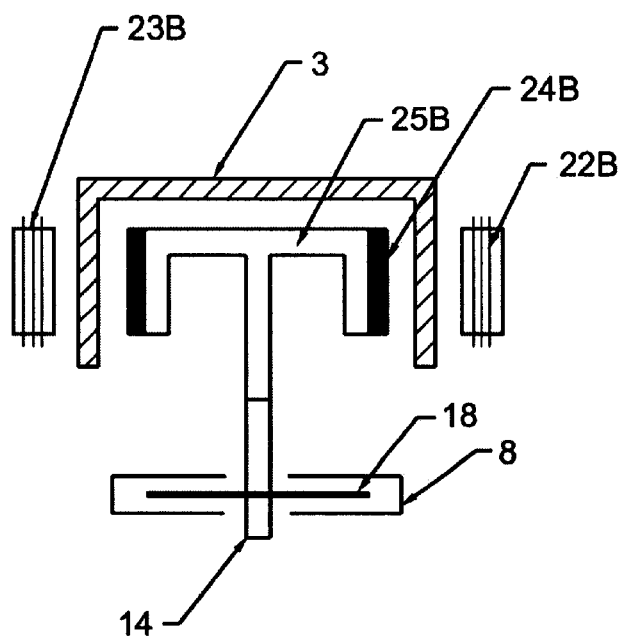

The entire rotary vane assembly is sealed inside the housing 2 and may be rotated by a motor, such as a stepper motor, having a stator which is magnetically, or inductively, coupled to a rotor. Two embodiments of such a motor are shown in FIGS. 6A and 6B. In FIG. 6A, the motor includes a stator composed of a multipole core 22A and windings 23A is disposed outside of housing 2, for example adjacent top 3, and a rotor composed of permanent magnets 24A carried by a coupling plate 25A disposed inside housing 2 and is secured to capacitor rotor 14. Currents supplied to windings 23A from a conventional motor control circuit (not shown) will produce magnetic fields that act on magnets 24A to rotate coupling plate 25A and rotor 14 to a desired angular position. In order to allow magnetic coupling between the stator and rotor, top 3 is made of a nonmagnetic material. Because the stator and rotor are magnetically coupled, housing 2 need not be provided with a separate sealing structure for the motor. Coupling plate 25A may be made of an electrical insulating material to prevent RF power from being transferred from the capacitor to the motor stator. Arrow 26 indicates the distance set between coupling plate 25A and the first stator vane 8 to minimize capacitive coupling therebetween. Motor 22 may be constructed according to principles known in the art, as disclosed, for example, in McGraw-Hill Encyclopedia of Science and Technology, $7^{th}$ Edition, Vol. 17, pp 417–420, McGraw-Hill, Inc, New York, 1992, and in published European Patent Application 0 175 903, published Apr. 2, 1986.

FIG. 6B shows a second embodiment which differs from that of FIG. 6A only with respect to the orientation of the stator and rotor. In FIG. 6A, the stator and rotor are configured and position to be magnetically coupled via top 3 of housing 2; in FIG. 6B they are coupled via the side wall of housing 2. Components 22B–25B of FIG. 6B are functionally identical to components 22A–25A of FIG. 6A.

As an example of implementing the motor, the capacitor rotor and motor rotor could be suspended on a bearing as a single assembly. A simple high torque motor with low inertia may provide rotational motion. The motor can also rotate in either direction to ensure the fastest response to attain a required capacitance. Because the motor requires a small amount of power to move the second vane pairs 18a, 18b, the device may be manufactured to be small in size.

To get a continuously varying capacitance, the motor should be able to rotate in small steps. The step size is preferably less than 1°. An alternative is to use a servomotor. A servomotor would have less inertia than a stepper motor and would eliminate step size considerations.

In the present invention, heat is removed by circulating fluid 36 between the first vane pairs 8a, 8b and the second vane pairs 18a, 18b as the rotor 14 rotates, as also seen in FIG. 2. The fluid 36 is injected through fluid injection ports 38 at one side of shaft 14 and evacuated through exhaust ports 38' at the other side of shaft 14, i.e. diametrically opposite ports 38. The fluid 36 serves two purposes. First, the fluid 36 serves as the capacitor's dielectric material, and can be selected to enhance the maximum potential difference which the capacitor can withstand without experiencing a voltage breakdown. Secondly, the fluid 36 functions as a coolant for removing heat.

The number of injection ports 38, and the number of exhaust ports 38' each preferably corresponds to the number of second vane pairs 18a, 18b. The ports 38 and 38' are defined by holes through the side wall housing 2. The ports 38 and 38' are positioned roughly opposite to edges of each vane 18 of the vane pairs 18a, 18b respectively. The fluid is injected into a cavity 39 formed in the interior of the housing 2 at very high speed. The speed is determined by heat load. As long as the heat is taken out the flow is sufficient. For conductive-convective cooling via forced fluid flow, the rate of heat removal is directly proportional to the Nusselt number or non-dimensional wall temperature gradient and, therefore, proportional to the flow velocity. High speed injection is necessary to remove bubbles that may form and tend to accumulate on surfaces of electrodes 28a, 28b of the stator 4 and the rotor 14. Careful design of the device is required in order to prevent generation of bubbles by cavitation. The direction of the fluid flow is generally parallel to the surfaces of the vanes 18a, 18b as shown in FIG. 2. This design ensures the rapid removal of the heat generated by the high RF voltage existing across the fluid 36 and between the first 8a, 8b and second 18a, 18b vane pairs.

High speed injection of the fluid 36 consequently helps to prevent an RF breakdown in the fluid 36. The high speed facilitates the desorbing of any gas, which would, in turn, forms bubbles. If formed, the bubbles drift toward high field points of the RF field of the device. When the bubbles attach to the electrodes 28a, 28b, shown in FIG. 2, the RF field increases in intensity and may cause the breakdown in the fluid 36. This breakdown could occur at a relatively modest RF field, if the flow is not strong enough to remove the bubbles from the electrode surface.

Figure 7:
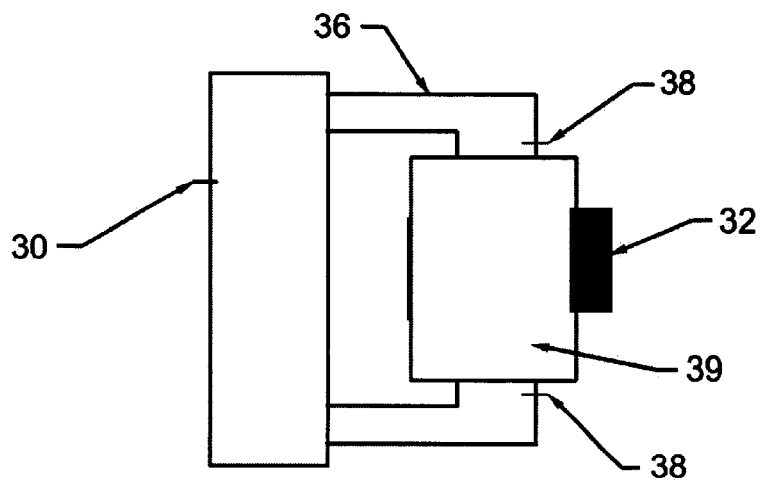
FIG. 7 is an alternative side view of the device of the invention illustrating means for rotating the rotor, circulating fluid, and detecting bubbles.

FIG. 7 illustrates that fluid 36 is pumped) by a pumping mechanism 30 from outside the housing 2 via injection ports 38, through cavity 39 and then via exhaust ports 38'. Within cavity 39, fluid 36 flows past all of the vanes, as shown in FIG. 2. Also illustrated in FIG. 7 is a bubble detection mechanism 32 which could be an optical, microwave, or ultrasonic mechanism which detects bubbles by monitoring the fluid. If bubbles are detected or, in the alternative, the RF power drops, the fluid speed is increased. Such detection mechanisms are well known in the art. The detection mechanisms can be the same as those that detect particulates. These are laser diffraction systems that can determine both the number and dimension distribution of particles or bubbles (i.e. phase-Doppler anemometry).

The removal of the heat will allow the device to operate at high current levels while still remaining within acceptable temperature limits. The operating temperature limit is determined by the boiling temperature of the fluid 36. At temperatures below the boiling point, the dielectric constant is relatively constant. The boiling temperature of dielectric fluids in general varies with the molecular weight of the fluids. However, higher molecular weight fluids are more expensive. Thus, a fluid is chosen for the system that provides a balance between cost and performance. One fluid that is presently preferred is commercially available Flourinert® fluid.

According to a further, optional feature of the present invention, a coating or layer of dielectric material having a dielectric constant much higher than that of the fluid is placed on one or both electrodes 28a, 28b. The fluid would now pass between a coated or bare electrode in order to facilitate heat removal. The flow is the same as above. There is just less channel thickness for the flow. This means the flow velocitiy must be higher, but the assurance of no arcing is greater because of the added material. If the material is a high dielectric as alumina, $\in$ (dielectric constant)=10, or rutile titanium oxide, $\in$=100, the thickness will not be as large a detriment to flow.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A variable capacitor comprising:

a housing;

a number of pairs of fixed first vanes positioned within the housing and forming a first plate of the capacitor;

a number of pairs of second vanes forming a second plate of the capacitor and mounted to rotate interdigitally between the number of pairs of fixed first vanes; and means for circulating a dielectric fluid between the first and second pairs of vanes.

2. An apparatus comprising:

a housing including a cylindrically shaped wall portion having a longitudinal axis, the housing having a top portion and a bottom portion, the wall portion having an inner surface;

a first number of vanes fixedly attached to the inner surface, the first number of vanes being arranged to form a plurality of first vane pairs, a first vane of each first pair being respectively positioned along the inner surface of the cylindrically shaped wall portion, and the other vane of each first pair being arranged along the inner surface and positioned in a plane with the first vane;

a rotor centrally positioned within the housing and configured for rotation therewithin, the rotor including an elongated shaft which extends along the axis;

a second number of vanes fixedly attached to the elongated shaft and arranged to form a plurality of second vane pairs, the second number of vanes being separated from the first number of vanes such that a capacitance exists between the first number of vanes and the second number of vanes;

wherein vanes of each of the second vane pairs are positioned on opposite sides of the shaft and radially extend therefrom, the second vane pairs being configured to rotate interdigitally between the first vane pairs, surfaces of the first and second vane pairs being substantially parallel to and spaced apart from each other when the second vane pairs rotate, and the capacitance varying in accordance with an overlapped area of the spaced apart surfaces;

a mass of dielectric fluid substantially filling the spaces between the first and second vane pairs, thereby removing heat therefrom; and means for circulating the dielectric fluid within the housing.

3. An apparatus according to claim 2, further comprising means for rotating the rotor.

4. An apparatus according to claim 2, further comprising electrodes positioned within the housing and electrically connected to the cylindrically shaped wall portion and the rotor.

5. An apparatus according to claim 2, further comprising bubble detecting means for detecting bubbles formed in the fluid when the gas is not removed, and for adjusting a speed of the fluid in accordance with an amount of the detected bubbles.

6. An apparatus capacitor according to claim 2, wherein each vane extends perpendicular to the longitudinal axis.

7. An apparatus according to claim 3, wherein the means for rotating is a motor.

8. An apparatus according to claim 2, wherein the fluid flows parallel to surfaces of the vanes.

9. An apparatus according to claim 2, wherein the wall portion includes:

a number of injection ports for receiving the fluid; and a number of exhaust ports for evacuating the fluid;

wherein the number of injection ports corresponds to the number of exhaust ports;

wherein a total number of injection ports and exhaust ports corresponds to the second number of vanes; and wherein each of the number of injection ports and exhaust ports is positioned in the vicinity of a corresponding vane of the second number of vanes.

10. An apparatus according to claim 2, wherein the fluid is a fluid dielectric.

11. A variable capacitor comprising:

a housing having a longitudinal axis;

a number of pairs of fixed first vanes positioned within the housing in a common plane perpendicular to the longitudinal axis of the housing and forming a first plate of the capacitor;

a number of pairs of second vanes forming a second plate of the capacitor and mounted to rotate interdigitally between the number of pairs of fixed first vanes; and means for circulating a dielectric fluid between the first and second pairs of vanes.

* * * * *